March 14, 1950     E. W. WAGNER     2,500,221
HUB CAP PULLER
Filed Nov. 14, 1947
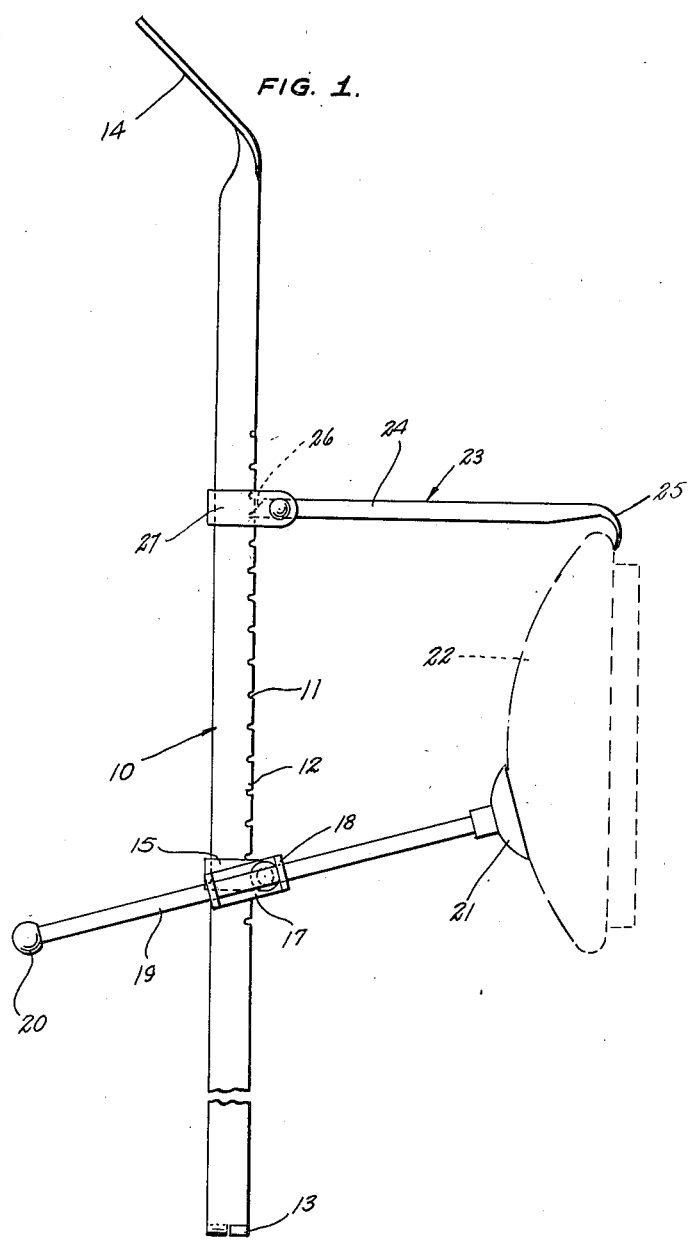
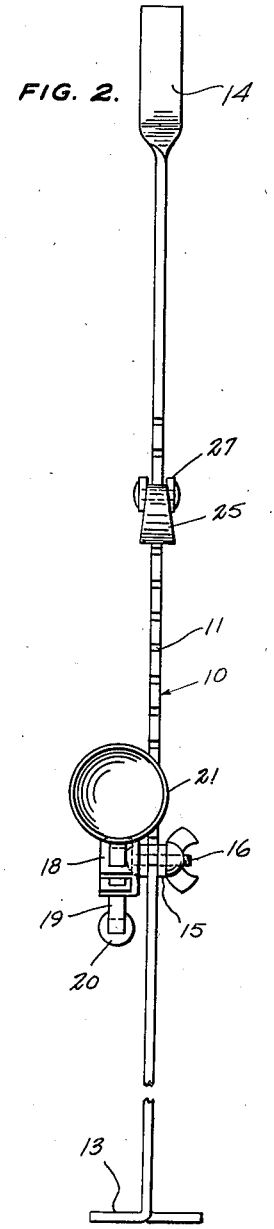
INVENTOR.
EDWARD W. WAGNER,
BY
McMorrow, Berman + Davidson
ATTORNEYS.

Patented Mar. 14, 1950

2,500,221

UNITED STATES PATENT OFFICE 2,500,221

HUB CAP PULLER

Edward W. Wagner, Parma, Ohio

Application November 14, 1947, Serial No. 785,981

2 Claims. (Cl. 29—245)

This invention relates to a tool for removing hub caps from vehicles.

An object of this invention is to provide an improved tool for removing hub caps which is so constructed that it can be readily adjusted to engage different sizes and types of caps without injury or scratching of the caps.

Another object of this invention is to provide a tool of this kind which includes an elongated notched lever bar having extending therefrom a pressure rod carrying a suction cup for engagement at one point on the outer surface of the hub cap and also includes a vertically adjustable hook for engagement on the outer edge of the hub cap to pull the cap upon outward swinging of the upper end of the lever bar.

A further object of this invention is to provide a device of this kind which is simple in construction so that it can be made of suitable material having sufficient strength and at the same time material light in weight in order that the device may be manufactured at a relatively small cost.

With the above and other objects in view, my invention consists in the arrangement, combination and details of construction disclosed in the drawings and specification, and then more particularly pointed out in the appended claims.

In the drawings,

Figure 1 is a detail side elevation partly broken away, of a hub cap puller constructed according to an embodiment of this invention, and Figure 2 is an inner end elevation of the device.

Referring to the drawings, the numeral 10 designates generally an elongated lever bar which is formed along the length thereof with a plurality of spaced notches 11 disposed on the inner edge 12 thereof.

The bar 10 at its lower end is provided with lateral and oppositely extending feet 13 so that the lower end of the bar 10 may be disposed on a floor or other plane surface. The upper end of the bar 10 is twisted and provided with an obtusely extending handle 14.

The bar 10 has mounted thereon a U-shaped member 15 through which a bolt 16 engages. The U-shaped member 15 extends about the bar 10 and the bolt 16 extends through the inner ends of the parallel sides of the U-shaped member 15 so that this member may be clamped in vertically adjusted position along the length of the bar 10.

The U-shaped member 15 has pivotally secured thereto a second U-shaped member or guide 17 which is secured to the U-shaped member 15 by the bolt 16. The guide 17 has extending through the outwardly projecting parallel legs 18 thereof an elongated bar 19 having a knob 20 on its outer end and a suction cup 21 on its inner end. The suction cup 21 is adapted to engage the outer convex surface of a hub cap 22 at a point below the center of the cap.

A puller 23 is also carried by the lever bar 10 and includes an elongated bar 24 which is formed at its inner end with a hook 25 adapted to engage over the rim or marginal edge of the hub cap 22.

The bar 24 at its outer end is formed with a tooth 26 which is engageable in a selected one of the notches 11. The bar 24 is pivotally carried by a U-shaped slide member 27 which loosely engages about the bar 10 and the slide 27 is lengthwise adjustable on the bar 10 and locked in adjusted position by engagement of the tooth 26 in a selected one of the notches 10.

In the use and operation of this device, the bar 19 is adjusted through the guide 17 with the suction cup 21 bearing against the lower portion of the cap 22. The hook 25 of the puller 23 is engaged over the rim of the cap 22 and the bar 24 is vertically adjusted so that this part will be in substantially a horizontal position as shown in Figure 1.

The upper end of the bar 10 carrying the handle 14 is then rocked outwardly and if desired the feet 13 may be held against movement on the floor by pressure of a foot or by engagement with the side of the tire.

Having thus described my invention, what I claim is:

1. A hub cap pulling device comprising an elongated lever engageable at one end with a fixed surface, an outwardly extending puller bar pivoted on said lever intermediate the length thereof, a hook on said puller bar engageable over the marginal edge of a hub cap for pulling said cap from a wheel upon outward rocking of said lever, a guide member pivoted on said lever adjacent said puller bar, a hub cap engaging bar slidable in said guide member, and a suction cup fixed on said latter bar engageable with said hub cap for supporting the hub cap on said lever after removal from the wheel.

2. A hub cap pulling device comprising an elongated lever engageable at one end with a fixed surface, a puller bar, means carried by said puller bar and said lever for pivotally supporting said puller bar on said lever at a selected position along the length thereof, a hook on said puller bar engageable over the marginal edge of the hub cap for pulling said cap from a wheel upon outward rocking of said lever, a guide member, means pivotally securing said guide member on said lever at a selected position along the length thereof, a hub cap engaging bar slidable in said guide member, and a suction cup fixed on said latter bar engageable with said hub cap for supporting the hub cap on said lever after removal from the wheel.

EDWARD W. WAGNER.

REFERENCES CITED

The following references are of record in the file of this patent:

UNITED STATES PATENTS

| Number | Name | Date |
|---|---|---|
| 1,179,732 | McFarland | Apr. 18, 1916 |
| 1,531,950 | Johnson | Mar. 31, 1925 |
| 1,587,777 | Juelfs | June 8, 1926 |
| 1,923,953 | Pembroke | Aug. 22, 1933 |
| 1,975,773 | Davis | Oct. 9, 1934 |
| 2,018,902 | Schwedland | Oct. 29, 1935 |
| 2,091,050 | McKechnie et al. | Aug. 24, 1937 |